United States Patent [19]
Biagi et al.

[11] 3,983,561
[45] Sept. 28, 1976

[54] HIGH FREQUENCY WAVE RADIATION SYSTEM PRODUCING A ROTATING BEAM DEFINING A PREDETERMINED GEOMETRICAL PATTERN

[75] Inventors: Alvaro D. Biagi, Huntington Station; Richard Silbiger, Dix Hills; Leslie Orloff, Huntington, all of N.Y.

[73] Assignee: Republic Electronic Industries, Inc., Melville, N.Y.

[22] Filed: Sept. 2, 1975

[21] Appl. No.: 609,235

[52] U.S. Cl. .............................. 343/787; 343/106 R; 343/778; 343/854
[51] Int. Cl.² ......................................... G01S 1/48
[58] Field of Search ............... 343/787, 833, 106 R, 343/854

[56] References Cited
UNITED STATES PATENTS

| | | | |
|---|---|---|---|
| 3,087,158 | 4/1963 | Fisch | 343/787 |
| 3,093,828 | 6/1963 | Stutz | 343/787 |
| 3,246,332 | 4/1966 | Waldman et al. | 343/787 |
| 3,560,978 | 2/1971 | Himmel et al. | 343/833 |

*Primary Examiner*—Eli Lieberman
*Attorney, Agent, or Firm*—Edward H. Loveman

[57] ABSTRACT

An electromagnetic wave radiation system includes an array of stationary antenna elements, a multiplicity of phase modulator units coupled to the antenna elements, a source of high frequency energy supplying energy to the antenna array, and modulator driving means activating the same to cause phase displacement and rotation of the beam transmitted by the antenna elements. The antenna may be a discone assembly or an assembly of antenna elements in a circular configuration, and the modulator units may be passive ferrite members located in the aperture of the antenna. The modulator driving units may comprise electromagnets located below the ground plane of the antenna and alternatively or selectively energized by in-phase and phase shifted sine wave voltages. One group of modulator units may be closely grouped around the central source of high frequency energy to generate a cardioid pattern and another group of modulator units may be arranged in a circle around the periphery of the antenna to generate a multiple lobed pattern. Both groups of modulator units may be activated simultaneously at different frequencies to produce a combined cardioid and multiple-lobed pattern.

4 Claims, 17 Drawing Figures

HIGH FREQUENCY WAVE RADIATION SYSTEM PRODUCING A ROTATING BEAM DEFINING A PREDETERMINED GEOMETRICAL PATTERN

This invention concerns a microwave antenna system in which a microwave beam is rotated continuously through 360° in one plane while a relatively fixed beam pattern is maintained in the orthogonal plane.

Heretofore it has been necessary to provide an antenna array with a complex external switching circuitry, or use some device spaced from the antenna array in the path of the radiated field, or to use rotating antenna elements, to generate a 360° rotating pattern such as a cardioid. Such assemblages of apparatus are large, complex and expensive. When circuit sections operate independently or sequentially, one or more sections can become inoperative without affecting the other so that defective radiation or termination can continue without detection.

It is a basic purpose of the present invention to avoid the difficulties and disadvantages of prior comparable microwave antennas by providing a simplified system using a stationary compact array from which a rotated directional wave is transmitted by the application of a rotating magnetic field to passive ferrite masses located in the aperture of the antenna.

It is desired to rotate a beam continuously about a full 360° in a particular plane while maintaining a relatively fixed beam pattern in the orthogonal plane. The rotation is to be accomplished without moving or supplemental mechanical means. The beam pattern is to be such that the demodulated signal in a receiver situated remotely from the radiator will be a continuous sinusoid or a combination of continuous sinusoids.

The basic radiator is a discone or an assembly of radiators in a circular pattern which produces a radiated field pattern omnidirectional in the H plane and broadly direction in the E plane. The aperture of the discone is the volume between the ground plane and the conical structure above it. An assemblage of units made of ferro-magnetic material such as Yttrium, Iron, and Garnet, hereinafter referred to as YIG material, is inserted in the antenna aperture surrounding a central microwave feed conductor. The microwave energy passes substantially unimpeded into space provided the composition of the YIG material selected is consistent with the frequency range of the microwave or radio frequency transmission. The YIG material will cause a phase displacement in the radiated pattern when subjected to a magnetic field. If permanent magnets are placed under the ground plane of the antenna and below the YIG units the H plane field will be affected.

Assume four permanent magnets positioned at equal intervals about the central feed conductor and under the ground plane and YIG units. These magnets are polarized to produce a magnetic field through the YIG material parallel to the ground plane in the direction of wave propagation. The polarities are selected so that all are in the same direction and two adjacent magnets are similarly polarized and the other two have less polarization than the first two. The effect of the radiated energy is to shift the phase of the H plane vectors about the circumference in such a manner as to reinforce the energy to a maximum between two similarly polarized magnets, and to a minimum between the other pair. The resultant antenna pattern is a cardioid. Depth of modulation is a function of the magnetic field strength and the geometry of the structure. Suppose the permanent magnets are now replaced with electromagnets similarly polarized. Utilizing the sum of a direct current and a sinusoidal current which has been split up into an in-phase and a quadrature component, the electromagnets are now energized in such manner that the direct current is applied in the same direction to all coils and the in-phase component is applied in opposite polarity to each of a pair of diametrically opposed coils, and the quadrature component is applied to the other diametrically opposed pair of coils in a similar manner. The result is a magnetic field which is the sum of a D.C. field and a rotating vector, the rate of rotation of which is equal to the frequency of the modulation.

The invention also involves means for radiating an accurate direction finding signal by using sinusoidal magnetic fields applied to passive YIG units situated in the antenna aperture. The complete bearing signal is a complex modulation in which the fine bearing vector may have nine lobes while there is one lobe in the coarse bearing vector pattern. Since each pattern rotates at the same rate, the signal appears at a remote detector as a sum of two sine waves, one at nine times the sine wave frequency of the other. It is necessary therefore to provide two modulating signals to the antenna which combine a rotating cardioid with a rotating nine-lobe pattern insofar as the resultant transmission is concerned. For use in a TACAN system, the transmission is also pulse coded in accordance with TACAN requirements.

The cardioid is achieved by means described above using four or more YIG units. The nine-lobe pattern can be achieved by means of thirty six YIG units inserted in the antenna aperture a prescribed distance from the central feed conductor and symmetrically around it. Near each YIG unit, but isolated from the R.F. energy of the antenna array is an electromagnet energized by a current sinusoidally modulated at a fixed frequency. The A.C. component of the current in the coil of each electromagnet is out of phase with its adjacent electromagnet by an amount equal to the spatial angle between them times the number of lobes.

It is therefore a principal object of the invention to provide an antenna array which generates the cardioid microwaves pattern out of a uniform distribution field by providing stationary YIG masses in the antenna aperture of the antenna with means for generating a rotating magnetic field located near the YIG masses, usually below the plane.

According to the invention, circumferentially spaced YIG masses are subject to superimposed magnetic field phase shifted at a predetermined rate, for example 15 cycles per second, to produce a rotating electromagnetic field. The rotating field defines in space a cardioid pattern of electromagnetic radiation which provides a coarse directional signal that can be received and detected in a bearing receiver as a sine wave. To provide a more accurate directional signal, another set of YIG masses is disposed circumferentially around the aperture of the antenna array and is subjected to an electromagnetic field energized at a higher rate, for example 135 cycle per second. Thirty-six YIG masses arranged in four groups may be used with the field shifted 90° between adjacent YIG masses. This produces a scalloped pattern of 9 lobes superimposed on the cardioid pattern. The scalloped pattern may be detected more accurately by a remote direction finding receiver.

The basic purpose of the invention is accomplished by subjecting stationary YIG masses located in the aperture of an antenna array to rotating magnetic fields.

These and other objects and many of the attendant advantages of this invention will be readily appreciated as the same becomes better understood by reference to the following detailed description when considered in connection with the accompanying drawings in which.

Figure 1:
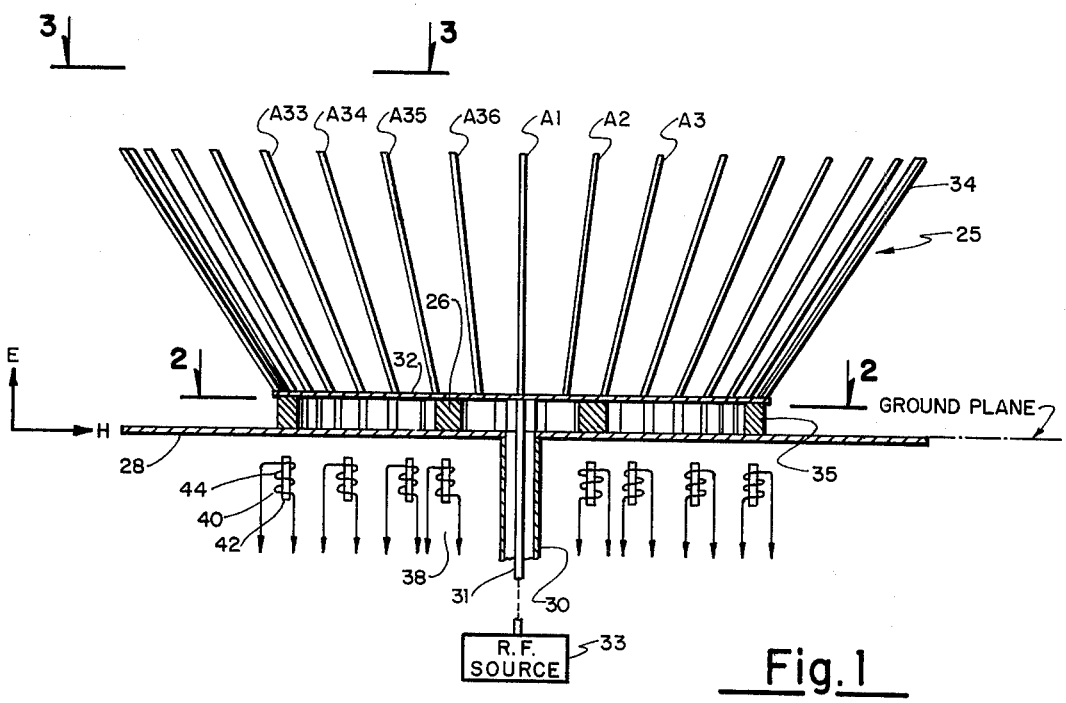
FIG. 1 is an axial sectional view of an antenna assembly arranged according to the invention, certain parts being shown schematically.
Figure 2:
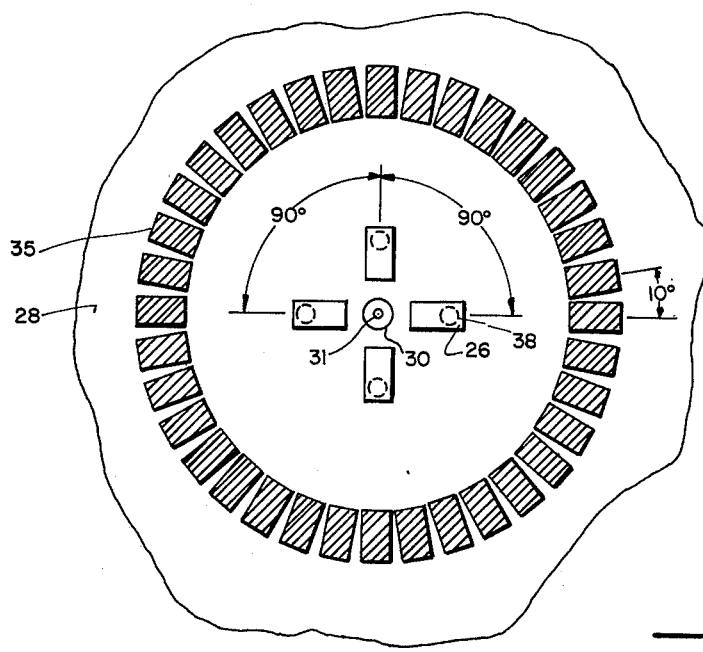
FIG. 2 is a fragmentary cross sectional view taken along line 2—2 of FIG. 1 orthogonal to the axis of the antenna assembly.
Figure 3:
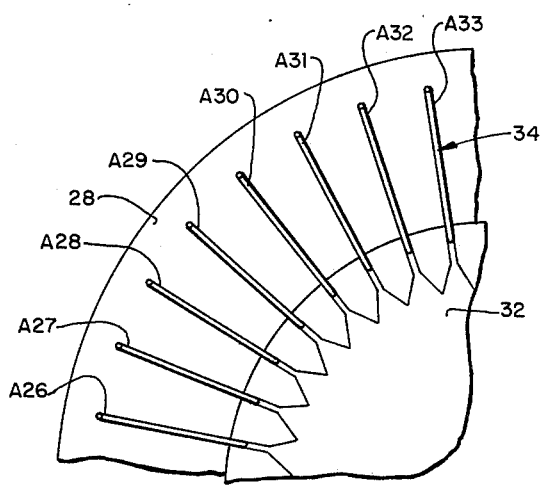
FIG. 3 is a fragmentary plan view taken along line 3—3 of FIG. 1 in a plane parallel to the plane of FIG. 2.
Figures 8, 10:
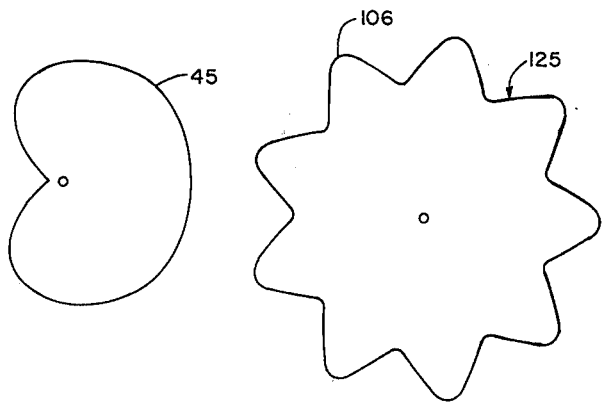
FIGS. 8, 9, 10, 12A and 13A are graphic diagrams of radiated field patterns.

Referring now to the drawings wherein like reference characters designate like or corresponding parts throughout, there is illustrated in FIGS. 1, 2 and 3 an antenna generally illustrated by reference numeral 25 in which four blocks 26 are mounted on a circular ground plate 28. The parts 26 are made of a ferromagnetic material such as the YIG material hereinbefore mentioned or any other magnetic material capable of transmitting microwave signals whose phase and attenuation is to be controlled magnetically. The bars 26 are made of YIG material and are spaced 90° apart surrounding a central tube 30. A center conductor 31 extends through the tube 30 from a remotely located source 33 of microwave or radio frequency energy. The conductor 31 feeds the microwave energy via a conductive sheet 32 to a plurality of antenna elements 34. A multiplicity of other bars 35 are made of YIG material are mounted on the plate 28 in circumferentially spaced positions near the periphery of the plate 28. The sheet 32 is disposed parallel to the plate 28 and rests on the bars 26 and 35 to which the sheet 32 is secured. The antenna elements 34 are secured in a conical array to the sheet 32. The bars 26 and 35 are secured to the ground plate 28 which defines the ground plate of the antenna assembly 25. Disposed underneath each one of the inner YIG blocks 26 is an electromagnet 38. Disposed under each one of the outer YIG bars 35 is an electromagnet 40. Each electromagnet 38 and 40 comprises a magnetic core 42 and a coil 44. The arrangements described constitutes a discone shaped antenna array which radiates microwave or radio frequency energy in a pattern determined by the electromagnetic fields generated when the YIG bars and their associated electromagnets are approximately energized. Each YIG bar serves as a modulator of the wave energy supplied by the center feed conductor 31. In the particular assembly illustrated there are four inner YIG bars 26 and 36 outer YIG bars 35. The antenna elements 34 are respectively designated A1-A36. The four inner YIG bars 26 and associated electromagnets 38 generate a rotating electromagnetic field which rotates the beam of the radiated wave causing it to define a 360° cardioid pattern 45 such as shown in FIG. 8.

Figure 4:
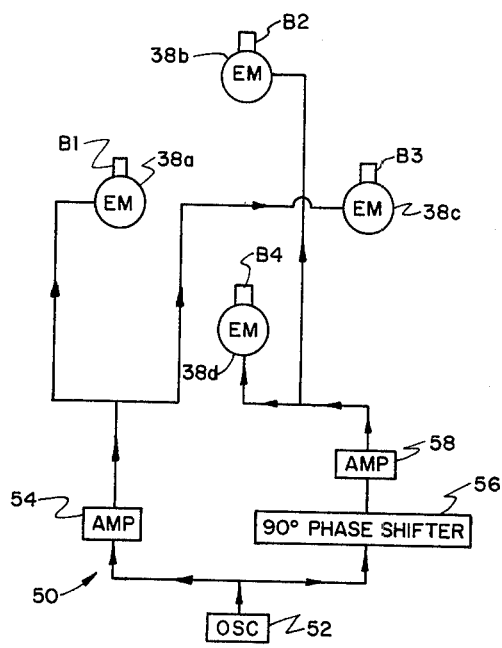
FIG. 4 is a diagram of apparatus used to generate a rotating magnetic field.

FIG. 4 shows a basic circuit generally illustrated by reference numeral 50 for generating a rotating electromagnetic field. An electrical oscillator 52 generally an oscillatory voltage which is applied to an amplifier 54 and to a 90° phase shifter 56. The phase shifted voltage is applied to another amplifier 58. The amplifier 54 is connected to the coils 44 of two alternate electromagnets 38a and 38c associated with two YIG bars B1 and B3 spaced 180° apart. The amplifier 58 is connected to the coils 44 of the other two alternate electromagnets 38b, 38d associated with YIG bars B2 and B4 also spaced 180° apart. Since the voltages applied to the two pairs of electromagnets 38 are in phase quadrature, a 360° rotating magnetic field is generated which modulates an electromagnetic field by the presence of the YIG bars. The oscillatory voltage supplied by the oscillator 52 can be any desired frequency. The rotating electromagnetic field will rotate at the frequency of oscillator 52.

Figure 5:
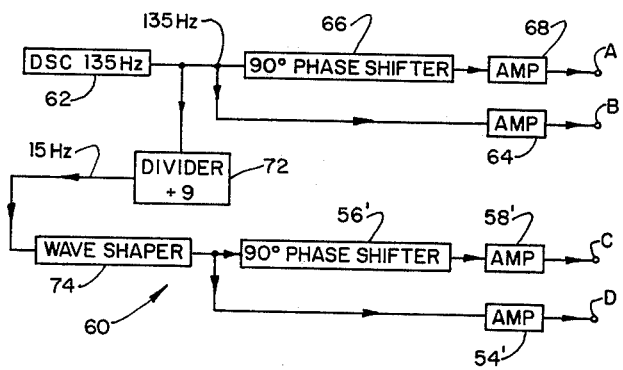
FIG. 5 is a diagram of a field coil drive circuit.

FIG. 5 shows a field coil drive circuit generally illustrated by reference numeral 60 adapted for use with antenna assembly 25 and incorporating the principles of operation exemplified by the circuit 50. Here an oscillator 62 generates an oscillatory voltage at a particular frequency useful in a direction finding system such as TACAN. This voltage, which can be 135 HZ as used in TACAN systems, is applied directly to an amplifier 64. It is also applied to a 90° phase shifter 66 connected to an amplifier 68. The outputs of the amplifiers 64 and 68 are applied to a respective circuit terminal B and A of a circuit generally illustrated by reference numeral 70 shown in FIG. 7. The oscillatory voltage at 135 HZ is also applied to a divider 72 and produces a lower frequency voltage. This may be a one-ninth divider to produce an output at 15 HZ. This output is applied to a wave shaper 74 to produce a sine wave which is applied to an amplifier 54' and a 90° phase shifter 56' connected to an amplifier 58'. The outputs from the amplifiers 54' and 58' are applied to a respective terminal D and C of a circuit generally illustrated by reference numeral 80 shown in FIG. 6. The circuit 80 is associated with the inner four electromagnets 38 and the YIG bars 26, while the circuit 70 is associated with the outer 36 electromagnets 40 and the YIG bars 35.

In the circuit 70 the electromagnets 40 are arranged in four groups of nine each. Each group of nine electromagnets 40 is in turn arranged in three smaller groups of three electromagnets each. In the circular array of 36 electromagnets 40, each fourth electromagnet 40 is in one of the groups of nine and in one of the groups of three. The coils 44 of the electromagnets in each group of three are connected in series. Thus three coils C'1, C'5 and C'9 are in series. Three coils C'13, C'17 and C'21 are in a second series connected group. Coils C'25, C'29 and C'33 are in a third series connected group. The three series connected groups are connected in parallel across a pair of conductors 82, 83. The conductor 82 is connected to a D.C. input terminal 85. The conductor 83 is connected via a capacitor 86 to the input terminal A which is the same as the output terminal A of the circuit 60 shown in FIG. 5.

Figure 9:
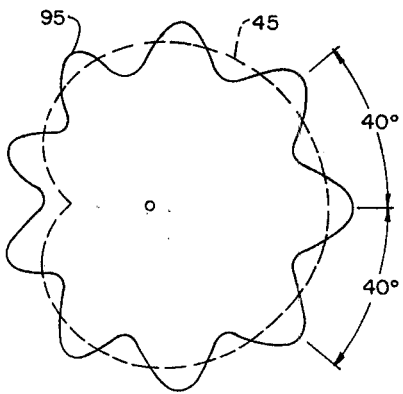

In a similar way the nine coils C'2-C'34 of each fourth electromagnet 40 in a second group of nine are connected between the conductor 82 and a conductor 90. The conductor 90 is connected to the circuit terminal B via a capacitor 88. The nine coils C'3-C'35 of each fourth electromagnet in a third group of nine are connected between the conductor 83 and a conductor 92. The conductor 92 is connected to a grounded D.C. input terminal 94. The nine coils C'4-C'36 of each fourth electromagnet in a fourth group of nine are connected between the conductors 90 and 92 and via the capacitor 88 to the terminal B which is the same as the terminal B in the circuit 60. A D.C. bias is applied to the circuit terminals 85, 94. By this arrangement oscillatory voltages in phase quadratures at 135 HZ are applied to the outer ring of the electromagnets 40 to generate a rotating electromagnetic field. This field causes the radiated wave pattern to have nine lobes spaced 40° apart as shown by a wave pattern 95 in FIG. 9.

Figure 6:
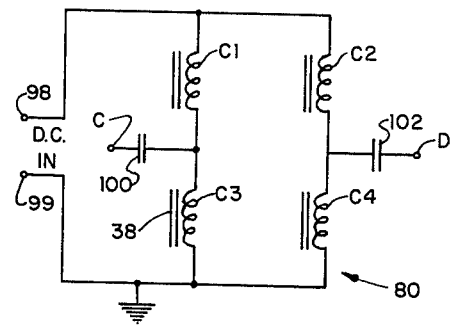
FIG. 6 is a diagram of a circuit used in producing a coarse bearing field pattern.
Figure 7:
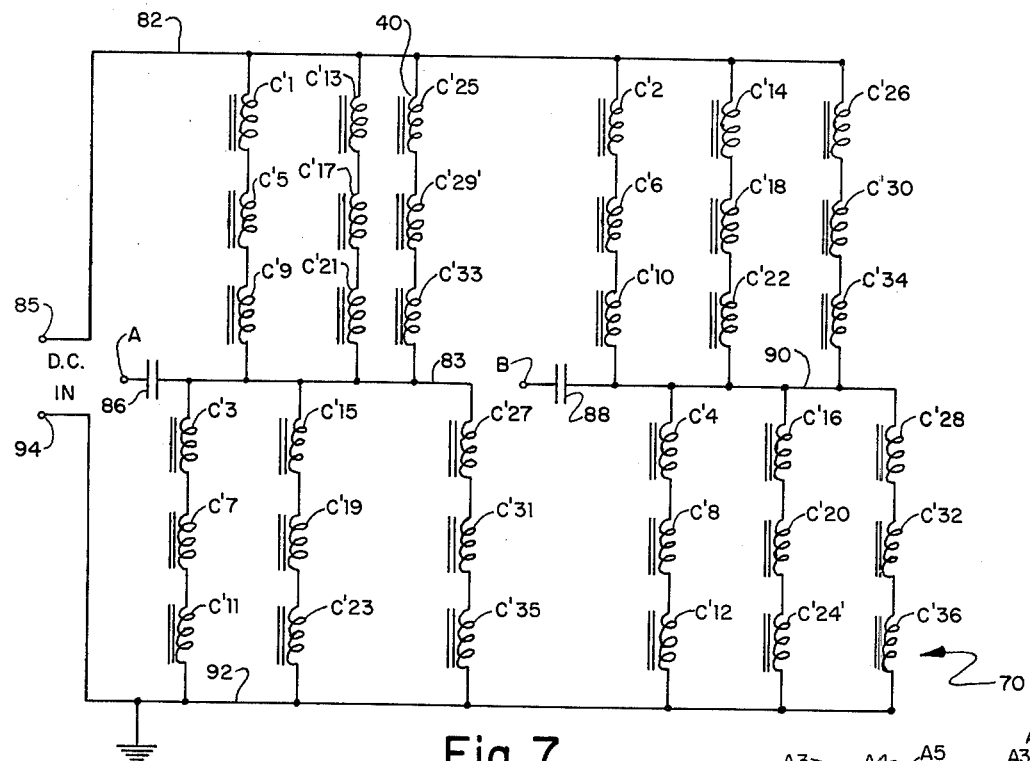
FIG. 7 is a diagram of a circuit used to produce a fine bearing field pattern.

In the circuit 80 of FIG. 6, a D.C. bias is applied to a pair of circuit terminals 98, 99. A coil C1 of one electromagnet 38 is connected between the circuit terminal 98 and a capacitor 100 connected to the circuit terminal C which is the same as the terminal C of the circuit 60 in FIG. 5. A coil C2 is connected between the terminal 98 and via a capacitor 102 to the terminal D which is the same as the terminal D of the circuit 60. A coil C3 is connected to the grounded terminal 99 and to the terminal C via the capacitor 100. A coil C4 is connected to the terminal 99 and to the terminal D via the capacitor 102. By the arrangement described, two coils of alternate electromagnets 38 spaced 180° apart receive either the low frequency oscillatory voltage generated by the circuit 60 and appearing at the terminal D, or the low frequency voltage in phase quadrature appearing at the terminal C. A rotating electromagnetic field is thus generated at the YIG bars 26 associated with the inner electromagnets 38 to create a cardioid pattern of the radiated microwave as mentioned above and shown in FIG. 8. When both inner and outer electromagnets 38, 40 are energized, the nine lobed pattern 95 is superimposed on the cardioid pattern 45 to produce a composite pattern 106 shown in FIG. 10. The cardioid pattern 45 of FIG. 8 may suffice for coarse bearing location when picked up by a bearing receiver, while the multiple lobed pattern of FIG. 10 enables fine bearing location.

It is possible to employ permanent magnets as the cores of the several electromagnets in either or both groups of electromagnets 38, 40 in the antenna assembly 25. If permanent magnets are used, then no D.C. voltages need be applied to the terminals 85, 94, 98, 99 of the circuits 70 and 80 for maintaining proper magnetic bias levels.

Figure 11:
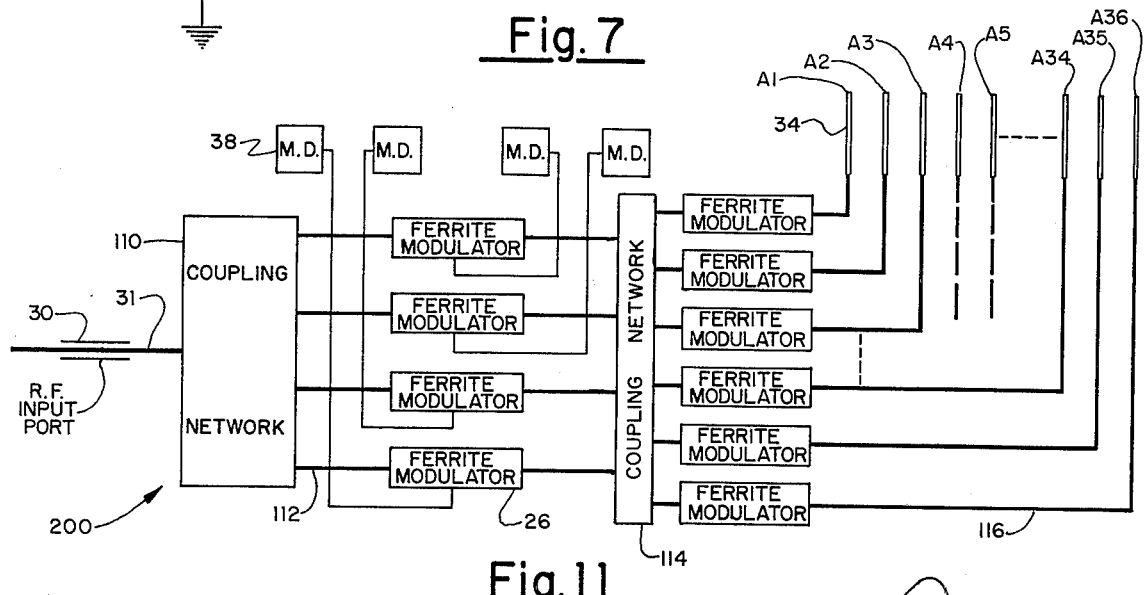
FIG. 11 is a general diagram of the antenna system.

FIG. 11 is a simplified general diagram of an antenna system generally illustrated by reference numeral 200 embodying the invention. The system includes an input port 30' corresponding to the tube 30 in FIG. 1 for passing radio frequency or microwave power to be radiated. The center conductor 31 is connected to a coupling network 110 (omitted from FIGS. 1-3 to simplify the drawing). The network 110 divides the radio frequency into $m$ parts, in this instance four parts. The $m$ (four) YIG modulating bars 26 provide phase and/or amplitude modulation on each of the m inputs 112 in such a way as to provide the proper characteristics for forming the described antenna pattern. A second coupling network 114 (omitted from FIGS. 1–3 to simplify the drawing) is connected to the YIG modulator bars to distribute the $m$ parts now modulated to n outputs 116 in this instance 36 outputs. The $n$ outputs now provide $n$ feed points for the array of the antenna elements 34. A series of $n$ radiating antenna elements 34, in this instance 36 are connected to outputs 116, each radiating antenna element having one feed input from one of the $n$ outputs 116. Each radiating antenna element has directional characteristics and orientation so as to further enhance the desired radiation pattern. Each of the YIG modulating bars is connected to a modulating drive unit such as one of electromagnets 38. Each modulating drive unit is used to vary properly the magnetic field applied to the YIG bars 26 which in turn interact with and modulate the ratio frequency energy supplied via the wire 31.

The basic system described above and shown in FIG. 11 may be modified in various ways without departing from the invention. For example more than one radio frequency port may be provided if a single port cannot supply sufficient driving power. Also more than one YIG modulating bar and additional coupling networks in the line feeding each antenna element may be provided. Furthermore, more than one array of radiating antenna elements may be provided so positioned with respect to each other to form any desired shape of radiated pattern. Although the antenna elements are equally spaced and are so shown in FIGS. 1 and 3, they can be unequally spaced or arranged in some other geometrical configuration to obtain any desired radiated pattern.

Figure 12A:
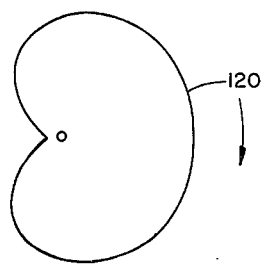
Figure 12:
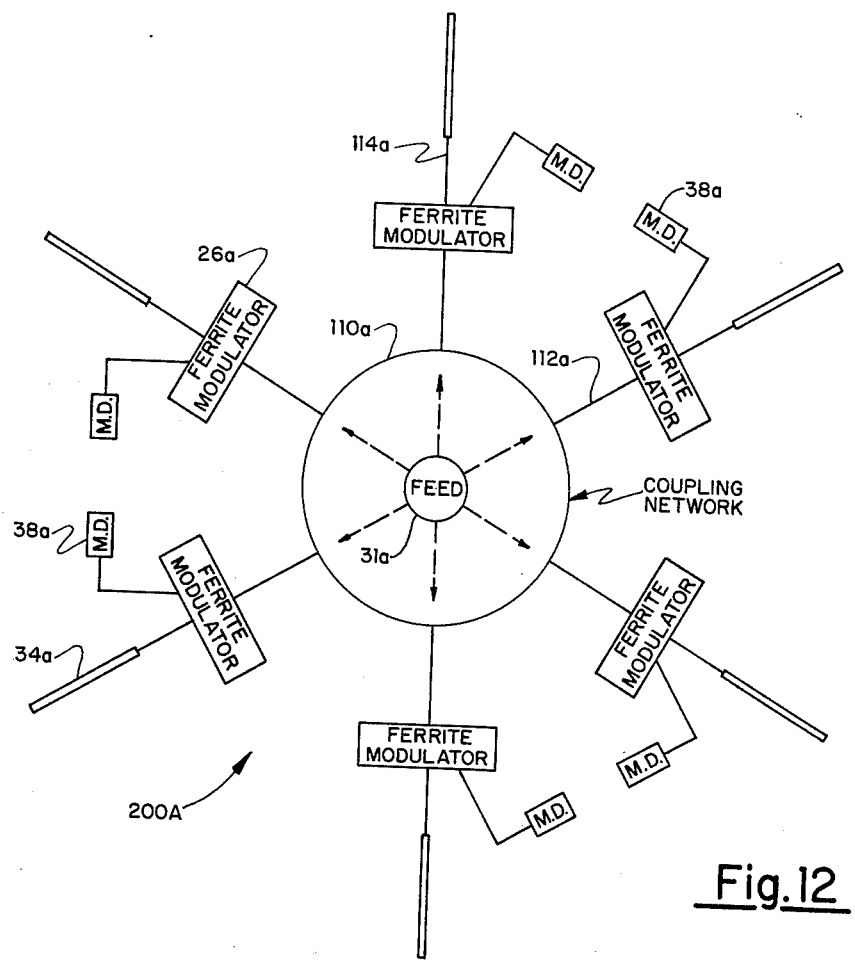
FIG. 12 is a diagram of another antenna assembly used to produce a coarse bearing field pattern.

FIG. 12 shows an antenna system generally illustrated by reference numeral 200 for producing a rotating single lobe pattern 120 shown in FIG. 12A. This can radiate at 15 revolutions per second and may be useful in TACAN coarse bearing detection system. The radiation as viewed at a point in space is ideally an amplitude modulated sinusoid having a frequency of 15 cycles per second. The phase of this sinusoid relative to a reference point determines the azimuth angle. The system 200A as shown in FIG. 12 includes an array of six equally spaced radiating antenna elements 34a arranged in a circular pattern. More or less than six antenna elements may be used, but six are considered optimum from a practical standpoint. The radio frequency input 31a is centrally fed to a coupling network 110 which produces six outputs 112a of equal amplitude and phase. These outputs are connected to six YIG modulating bars 26a, each driven by one of the six outputs 112a. Each modulated output is then fed to a radiating antenna element 34a via a direct connection 114a. The direct connections replace or are equivalent to the second coupling network 114 shown in FIG. 11. The modulator driving means (M.D.) 38a associated with the YIG modulators may provide a DC generated magnetic field, modulated with a 15 cycles per second component. Each modulator driver 38a has a phase shift delay of the 15 c.p.s. component relative to a reference which is equal to the angle of its spatial position in the antenna array.

Figure 13A:
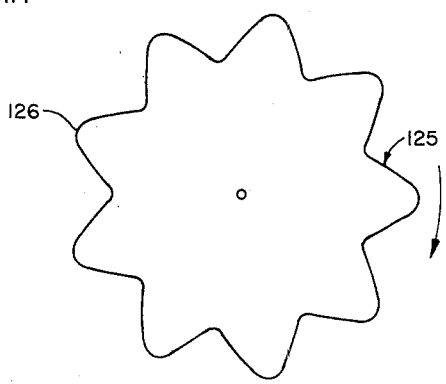
Figure 13:
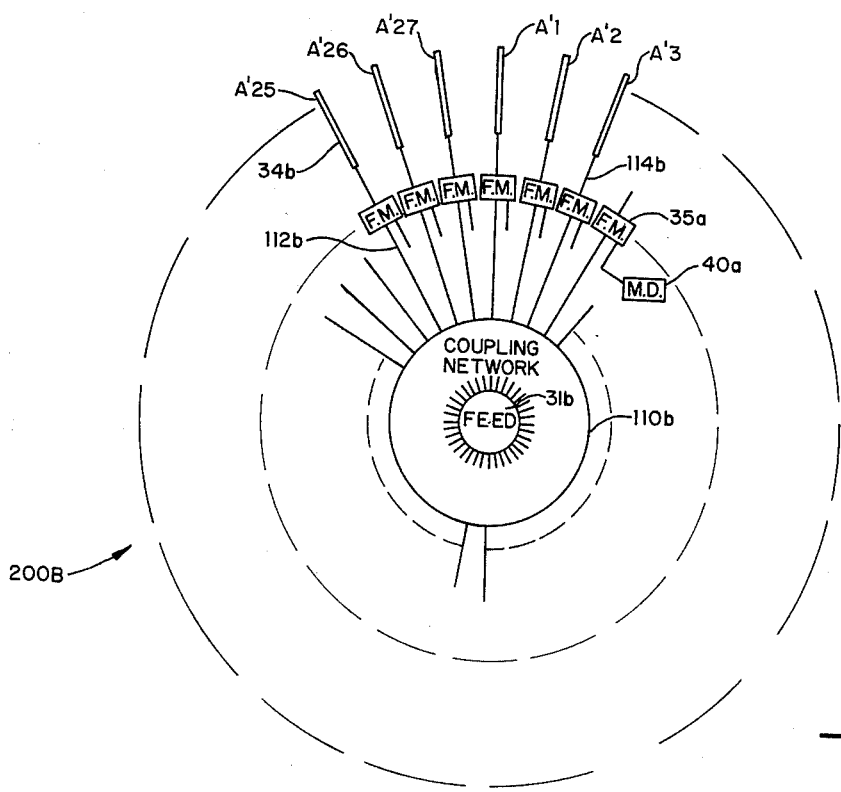
FIG. 13 is a diagram of another antenna assembly used to produce a fine bearing field pattern.

FIG. 13 illustrates an antenna system generally illustrated by reference numeral 200B for enabling fine bearing detection. This system produces a nine-lobe radiation pattern 125 shown in FIG. 13A. This pattern rotates in space with each lobe 126 making 15 revolutions per second. The radiation as viewed from a point in space is sinuosid of 135 cycles per second frequency. The phase of this signal provides fine resolution of the bearing angle at the receiver in a TACAN system. The system 200B employs twenty-seven radiating antenna elements 34b designated successively A'1-A'27. The antenna elements are arranged circular and are equally spaced circumferentially. More or less than twenty-seven elements can be used but not less than 19, to avoid undue distortion of the modulation. The radio frequency feed 31b is applied to the coupling network 110b which has twenty-seven outputs 112b applied to 27 YIG modulators 34a each having an associated modulator driver 40a. The 27 outputs 114b of the YIG modulators are directly coupled to the antenna elements 34b. Each modulator driver has a phase shift delay of the 135 cps component, relative to a reference, which is equal to nine times its spatial position of the antenna arrays.

Figure 14:
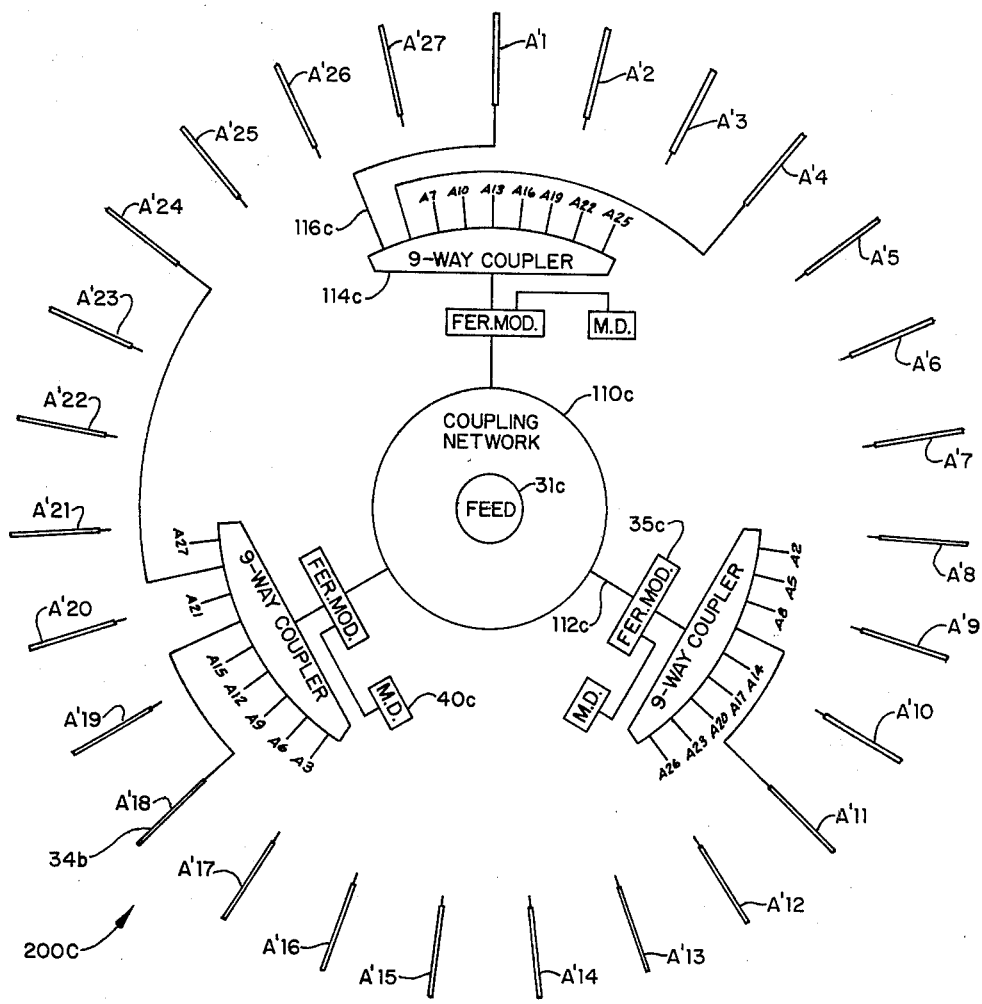
FIG. 14 is a diagram of a further antenna assembly used to produce a fine bearing field pattern.

FIG. 14 shows another antenna system generally illustrated by reference numeral 200C for producing the nine-lobe pattern 125C shown in FIG. 13A and using twenty-seven antenna elements 34b. This system uses less YIG modulators than employed in the system 200B. In the system 200C radio frequency feed 31c is connected to a coupling network 110c which has only three outputs 112c connected to three YIG modulators 35c each having its own modulator driver 40c. The modulator drivers provide a D.C. biased field varied by a 135 c.p.s. waveform performed at 0°, 120° and 240° respectively. The output of each YIG modulator is applied to one of three further coupling networks 114c, 114c' and 114c'', each of which has nine equally modulated outputs 116c. This produces a total of 27 feeds for the 27 antenna elements individually designated A'1-A'27. Every third radiating element is attached to the same coupler. The antenna array has nine-way symmetry and thus produces nine lobes in radiation pattern 125.

Figure 15:
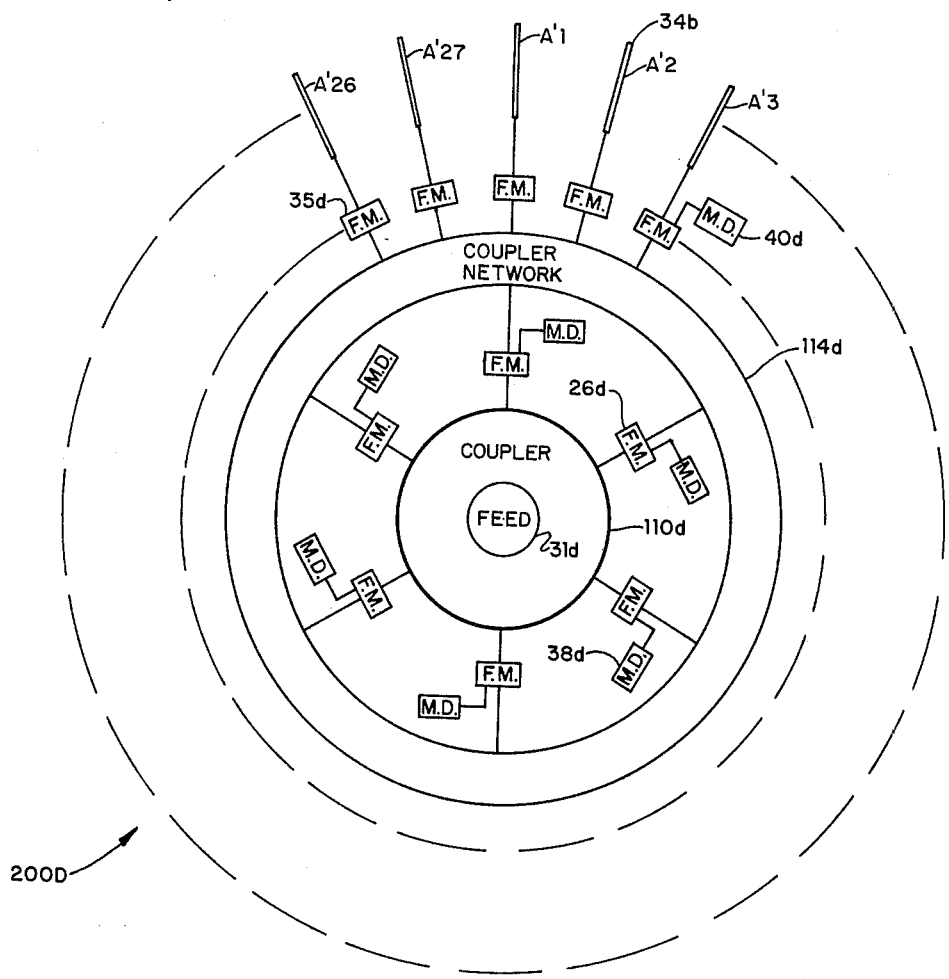
FIG. 15 is a diagram of another antenna assembly used to produce a combined fine and coarse bearing field pattern.

FIG. 15 shows a system 200D for providing both coarse and fine bearing signals simultaneously using the same antenna array 34b as in systems 200B and 200C but separate sets of YIG modulators. Twenty-seven antenna elements A'1-A'27 are again circularly arranged and equally spaced circumferentially. Radio frequency feed is applied to the coupling network 110d which drives the six YIG modulators 26d each having its own modulator driver 38d. This provides a coarse field pattern as described in connection with the system 200A in FIG. 12. The six outputs of the YIG modulators are applied to a second coupler network 114d which is connected to an array of twenty-seven YIG modulators 35d each having its own modulator driver 40d. The 27 outputs of the YIG modulators are connected directly to the antenna elements to produce the desired combined fine and coarse radiation pattern.

Other expedients may be used to obtain combined coarse and fine bearing signals. One way may be to combine systems 200A and 200B. The coarse antenna array and fine antenna array will be stacked concentrically about their feed points and fed from the same source of radio frequency energy. The radiated field will then produce the desired combined pattern if the relative amplitudes of the two atenna drives and their relative phases are adjusted properly.

Another method can use the system 200B, which produces fine bearing signals. The modulation required for the coarse pattern can be added to the modulation of the fine patterns. The resulting summation will cause the radiated field to have the desired combined fine and coarse pattern.

YIG modulators are used in the systems described herein because they provide reliable signal modulation with fairly low loss of power. This is mostly phase shift modulation. Other types of phase shifters can be used in certain instances, such as diode phase shifters, to produce the desired phase shift modulation, however, the circuits would be more complex, than those which utilize YIG modulators. Further, the phase shift modulation produced by YIG modulators have several other advantages. It is inherently lossless with respect to the signals modulated. It can be realized at relatively low cost as compared with other means for phase modulation. The array of antenna elements can have a smaller diameter than is required for an amplitude modulated array. The antenna elements can be simple radiating members such as dipoles, but other directional devices such as horns can be substituted. Each antenna element could in itself be an array of elements in certain installations, or it could be complex radiating structure if necessary to produce a complex radiation pattern. Depending on requirements of the system, the individual radiation modulators can be realized in either an analog or digital fashion.

It should be understood that the foregoing relates to only a limited number of preferred embodiments of the invention, which have been by way of example only, and that it is intended to cover all changes and modifications of the examples of the invention herein chosen for the purposes of the disclosure, which do not constitute departures from the spirit and scope of the invention.

The invention claimed is:

1. An electromagnetic wave radiation system comprising:
   a stationary discone antenna array for transmitting a beam rotating in one plane and defining a directional wave pattern in another plane orthogonal to said one plane;
   a source of high frequency wave energy comprising an input conductor located at the center of said antenna array at a ground plane thereof;
   a multiplicity of stationary phase modulator units which are ferro magnetic masses located in a circle around the periphery of said array and arranged to cause phase displacement of said beam so that said beam rotates continuously through 360° in said one plane while producing said directional wave pattern in said other plane; and
   modulator driving means associated with each of said modulator units for activating the same to cause the phase displacement and rotation of said beam; said modulator driving means comprising:
   a plurality of electromagnets located below said ground plane at each of said phase modulator units;
   a source of sine waves of one frequency connected to certain spaced ones of said electromagnets;
   a means for shifting said sine waves in phase by 90°; and
   a circuit means connecting said wave shifting means to other spaced ones of said electromagnets whereby a multiple lobed pattern is generated when said beam rotates through 360°.

2. An electromagnetic wave radiation system as defined in claim 1, further comprising a first coupling means connecting said source to said modulator units, and a second coupling means connecting said modulator units to said antenna array.

3. An electromagnetic wave radiation system as defined in claim 1, further comprising:
a plurality of other phase modulator units each composed of Yttrium Iron and Garnet material and grouped around said input conductor radially inward of said first named modulator units;
other electromagnets located below said grouped plane at each of said other phase modulator units; and other modulator driving means comprising:
another source of sine waves of a lower frequency than said one frequency, a circuit means connecting said other source to alternate ones of said other electromagnets, a means for shifting the phase of said sine waves of said lower frequency by 90°, and other circuit means connecting said last named wave shifting means to the remaining alternate ones of said other electromagnets so that said beam defines a predetermined continuous geometric pattern in rotation through 360° and whereby said multiple lobed pattern is combined with said continuous geometric pattern.

4. An electromagnetic wave radiation system as defined in claim 3, further comprising a first coupling network connecting said input conductor to said other phase modulator units, a second coupling network coupling said other phase modulator units to the first named phase modulator units; and
means connecting the first named phase modulator units to said antenna elements.

* * * * *